US009219998B2

(12) United States Patent
King et al.

(10) Patent No.: US 9,219,998 B2
(45) Date of Patent: *Dec. 22, 2015

(54) PARTICIPANT GROUPING FOR ENHANCED INTERACTIVE EXPERIENCE

(71) Applicant: PRESIDENT AND FELLOWS OF HARVARD COLLEGE, Cambridge, MA (US)

(72) Inventors: Gary King, Brookline, MA (US); Eric Mazur, Concord, MA (US); Brian Lukoff, Boston, MA (US)

(73) Assignee: PRESIDENT AND FELLOWS OF HARVARD COLLEGE, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/537,790

(22) Filed: Nov. 10, 2014

(65) Prior Publication Data

US 2015/0072717 A1    Mar. 12, 2015

Related U.S. Application Data

(63) Continuation of application No. 13/458,040, filed on Apr. 27, 2012, now Pat. No. 8,914,373.

(60) Provisional application No. 61/480,565, filed on Apr. 29, 2011.

(51) Int. Cl.
G06F 17/30       (2006.01)
G06F 7/00        (2006.01)
H04W 4/08        (2009.01)
G06F 21/41       (2013.01)
G06Q 10/06       (2012.01)
H04W 4/02        (2009.01)

(52) U.S. Cl.
CPC .......... *H04W 4/08* (2013.01); *G06F 17/30893* (2013.01); *G06F 17/30896* (2013.01); *G06F 21/41* (2013.01); *G06Q 10/06311* (2013.01); *H04W 4/02* (2013.01)

(58) Field of Classification Search
None
See application file for complete search history.

(56) References Cited

U.S. PATENT DOCUMENTS

2003/0014400 A1   1/2003   Siegel
2006/0252547 A1*  11/2006  Mizrahi et al. .......... A63F 13/10
                                                          463/42
2007/0027889 A1*   2/2007  Kaufman ...................... 707/101
2008/0052203 A1*   2/2008  Beyer et al. ..................... 705/28
2008/0254431 A1   10/2008  Woolf et al.
2009/0171686 A1*   7/2009  Eberstadt .......................... 705/1

(Continued)

OTHER PUBLICATIONS

International Search Report mailed Jul. 24, 2012 for International Patent Application PCT/US2012/035423, 2 pages.

(Continued)

*Primary Examiner* — Dung K Chau
(74) *Attorney, Agent, or Firm* — Kilpatrick Townsend & Stockton LLP

(57) ABSTRACT

Representative embodiments of a method for grouping participants in an activity include the steps of: (i) defining a grouping policy; (ii) storing, in a database, participant records that include a participant identifier, a characteristic associated with the participant, and/or an identifier for a participant's handheld device; (iii) defining groupings based on the policy and characteristics of the participants relating to the policy and to the activity; and (iv) communicating the groupings to the handheld devices to establish the groups.

20 Claims, 5 Drawing Sheets

(56) References Cited

U.S. PATENT DOCUMENTS

| | | | | |
|---|---|---|---|---|
| 2009/0305218 | A1* | 12/2009 | Dozier et al. | 434/362 |
| 2010/0114702 | A1* | 5/2010 | Wu et al. | 705/14.53 |
| 2010/0131896 | A1* | 5/2010 | Fitzmaurice et al. | 715/811 |
| 2011/0004511 | A1* | 1/2011 | Reich | 705/14.1 |
| 2011/0065082 | A1* | 3/2011 | Gal et al. | 434/365 |
| 2011/0119733 | A1* | 5/2011 | Proctor et al. | 726/1 |
| 2011/0209192 | A1* | 8/2011 | LeClerc Greer et al. | 726/1 |
| 2011/0300926 | A1* | 12/2011 | Englman et al. | 463/25 |
| 2012/0030289 | A1* | 2/2012 | Buford et al. | 709/205 |
| 2012/0197986 | A1* | 8/2012 | Chen et al. | 709/204 |

OTHER PUBLICATIONS

Supplemental European Search Report, mailed Oct. 10, 2014, for European Patent Application EP 12 77 6043, 1 page.

Wikipedia: "Location-based service". Internet Article. Apr. 16, 2011. XP055145661. Retrieved from the Internet: URL:http://en.wikipedia.org/w/index.php?title=Location-based service&oldid=424364434 [retrieved on Nov. 6, 2014].

Wikipedia: "Social networking service". Internet Article. Apr. 28, 2011. XP055145663. Retrieved from the Internet: URL:http://en.wikipedia.org/w/index.php?title=Social networking service&oldid=426414450 [retrieved on Nov. 6, 2014].

Wikipedia: "Smartphone". Internet Article. Apr. 27, 2011. XP055145665. Retrieved from the Internet: URL:http://en.wikipedia.org/w/index.php?title=Smartphone&oldid=426201205 [retrieved on Nov. 6, 2014].

* cited by examiner

PARTICIPANT GROUPING FOR ENHANCED INTERACTIVE EXPERIENCE

CROSS-REFERENCES TO RELATED APPLICATIONS

This application is a continuation of U.S. application Ser. No. 13/458,040, filed on Apr. 27, 2012, entitled "Participant Grouping for Enhanced Interactive Experience," which claims priority to and the benefit of U.S. Provisional Patent Application No. 61/480,565, filed on Apr. 29, 2011, both of which are incorporated herein by reference in their entireties.

STATEMENT AS TO RIGHTS TO INVENTIONS MADE UNDER FEDERALLY SPONSORED RESEARCH AND DEVELOPMENT

This invention was made with government support under National Science Foundation award IIS-0835338.. The government has certain rights in the invention.

FIELD OF THE INVENTION

In various embodiments, the present invention relates generally to grouping participants in an activity for enhancing interactive experience.

BACKGROUND OF THE INVENTION

Learning new skills or knowledge traditionally involves lectures, where an instructor spends a majority of time presenting materials to the participants in an activity. The instructor is primarily responsible for pacing the activity and setting the level of rigor. Participant involvement, unfortunately, tends to be limited to asking questions when confusion arises. Such one-way communication discourages critical thinking and has been shown to do little in improving the participants' understanding of the concepts presented.

Various teaching methods in which participants actively discuss new material among themselves encourage engagement and allow the participants to cooperatively reach consensus on correct answers, which results in a deeper understanding of new material. Such cooperative learning methods including, for example, "peer instruction" and "think-pair-share," generally require appropriately grouping the participants so as to foster a positive and meaningful discussion in each group. See, e.g., Crouch & Mazur, "Peer Instruction: Ten years of experience and results," *American Journal of Physics,* 69(9), 970. (2001); E. Mazur, *Peer Instruction: A User's Manual.* (1997); Cooper & Robinson, "*Getting Started: Informal Small-Group Strategies in Large Classes*" New *directions for teaching and learning,* 81, 17-24. (2000).

Conventionally, the instructor or organizer allows participants to self-select into groups; this is especially common in large activities or when groups are arranged based on the spatial locations of the participants. As a result, some participants are grouped with others who have comparable knowledge, the same misconception, or the same correct understanding; this reduces learning opportunities through productive conversations within the group. A "productive conversation" as used herein means one in which each participant in the group gains from the discussion experience, such as switching from the wrong answer to the correct answer, improving his or her understanding of the correct answer, or developing a greater understanding of why the wrong answers are in fact wrong. Grouping the participants randomly or with an unplanned approach may produce productive conversations only by chance, thereby greatly hampering the potential and effectiveness of the cooperative learning approaches.

Consequently, there is a need for an approach that groups participants in an activity with a substantially high likelihood of producing productive conversations in each group.

BRIEF SUMMARY OF THE INVENTION

Embodiments of the present invention facilitate automatic grouping of participants in an activity such that each group is likely to produce productive conversations. In various embodiments, the participants' identifiers and/or characteristics are first transmitted via electronic devices to a central server and stored in a database. Individuals in the database who have similar characteristics and/or criteria relevant to the activity are selected as a training set. A functional relationship between the characteristics of the selected individuals in the training set and the likelihood of having productive conversations is computationally estimated. Based on the estimated functional relationship, the characteristics of participants in the activity, and/or a grouping policy, a probability of having productive conversations in each potential group of participants is obtained. Groupings having a high or maximum predicted likelihood of achieving productive conversations in each group are selected; the participants are then instructed to form groups based thereon via the electronic devices. As the information of more participants is stored in the database and more successful groupings (i.e., groups having productive conversations) are formed and analyzed, the likelihood of making an accurate prediction increases; this provides improvements in the grouping predictions over time without changing the underlying approach.

Accordingly, in one aspect, the invention pertains to a method of grouping participants in an activity, the participants each having a handheld device. In various embodiments, the method includes the steps of defining a grouping policy; storing, in a database, participant records each including a participant identifier, an identifier for the participant's handheld device, and at least one characteristic associated with the participant; defining groupings based on the policy and characteristics of the participants relating to the policy and to the activity; and communicating the groupings to the handheld devices to establish the groups.

The grouping policy may include or consist of deterministic rules and/or may be created adaptively based on one or more statistical models relating participant characteristics to conversational productivity. In some embodiments, the deterministic rules include requiring two or more different associated values for one or more participant characteristics in each group. The participant characteristic may include a behavioral characteristic, a performance characteristic, and/or a demographic characteristic. In various embodiments, the statistical model is a coarsened exact matching model. The conversational productivity may include switching from a wrong answer to a correct answer, improving the participants' understanding of the correct answer, and/or improved understanding of why a wrong answer is wrong. Additionally, the grouping policy may be based at least in part on geographic proximities among potential group members. For example, the participants may be co-located within a single defined space and the grouping policy requires a defined proximity between members of a group based on geographic locations of the handheld devices.

The characteristics of the participants may be weighted by selecting a training set of individuals and computationally estimating a functional relationship between the characteristics and a grouping success likelihood based on the training set. The training set is larger than or equal to the number of the participants to be grouped and the individuals in the training set are related to the participants based on criteria relevant to the activity. In some embodiments, each participant has an associated value for each characteristic, and groupings are defined by (i) defining a set of candidate participant groupings consistent with the grouping policy and, for each candidate grouping, estimating a grouping success likelihood based on the functional relationship as applied to the values of the characteristics associated with each participant within the candidate grouping; and (ii) selecting optimized groupings based on the estimated grouping success likelihoods. The training set may be established based on nonparametric matching of candidate individuals to the participants using inputs that are specific to each individual and incorporate the criteria. In one embodiment, the inputs include demographic characteristics, behavioral characteristics, and/or performance characteristics. The demographic characteristics include participants' backgrounds, an organizer's background, and/or a geographic location of the activity. The performance characteristics include participants' performances in other activities and/or in the same activity previously. The grouping success of the selected optimized groupings may be analyzed and the functional relationship may be updated based thereon.

In a second aspect, the invention relates to a system for grouping participants in an activity, the participants each having a handheld device. In various embodiments, the system includes a memory for storing a participant database having a record for each of the participants and a processor in operative communication with the memory. Each record stored in the participant database may specify a participant identifier, an identifier for the participant's handheld device, and one or more characteristics associated with the participant. For example, the database record for each participant includes fields for a behavioral characteristic, a performance characteristic, and/or a demographic characteristic. The processor may be configured to: (i) define groupings of participants based on a grouping policy and characteristics of the participants, stored in the database, relating to the policy and to the activity; and (ii) communicate the groupings to the handheld devices to establish the groups. Additionally, the processor may be configured to create the grouping policy adaptively based on one or more statistical models stored in the memory and relating participant characteristics to conversational productivity. In one embodiment, the statistical model is a coarsened exact matching model.

The memory may include a rules database for storing rules defining the grouping policy. The deterministic rules, for example, may require two or more different associated values for one or more participant characteristics in each group. The memory may further include a training database having records corresponding to individuals collectively defining a training pool. Additionally, the processor may be configured to weigh the characteristics of the participants by: selecting, from the training database, a training set of records, and computationally estimating a functional relationship between the characteristics and a grouping success likelihood based on the training set. In one embodiment, the training set is larger than or equal to a number of the participants to be grouped and the individuals in the training set are related to the participants based on criteria relevant to the activity.

The database record for each participant may include an associated value for each characteristic, and the processor is configured to define groupings by (i) defining a set of candidate participant groupings consistent with the grouping policy and, for each candidate grouping, estimating a grouping success likelihood based on the functional relationship as applied to the values of the characteristics associated with each participant within the candidate grouping; and (ii) selecting optimized groupings based on the estimated grouping success likelihoods.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION OF THE INVENTION

As used herein, the term "event" refers to a gathering of "participants" led by one or more "instructors" in which the instructors desire to use handheld devices to measure participants' attitudes, opinions, knowledge, or understanding about the relevant subject matter. The most common case consists of students attending a class led by a professor or graduate student who wants to gauge student understanding of the content. However, participants need not be in the same room as each other or the instructor, so events encompass distance learning situations. In addition, participants need not be students; they might be employees participating in a corporate training event, or workshop participants attending a workshop where the session leader wishes to gauge the opinions of the participants. An "item" is a question that an instructor poses to participants during an event and that participants respond to by using handheld devices. Items may or may not have a correct answer and may have any response format (i.e., they need not be multiple-choice). Items may attempt to assess factual information, tease out conceptual difficulties, or measure participants' opinions.

The present discussion focuses in part on students in a college classroom environment, it should be understood that the approach described herein is applicable to participants in any group pedagogical or intellectual endeavor, and the terms "student" and "participant" are used herein interchangeably. In addition, the term "instructor" used herein is not limited to a teacher or a professor in the classroom; the "instructor" may be a facilitator in a corporate event or in any group pursuing a pedagogical or intellectual endeavor.

Figure 1A:
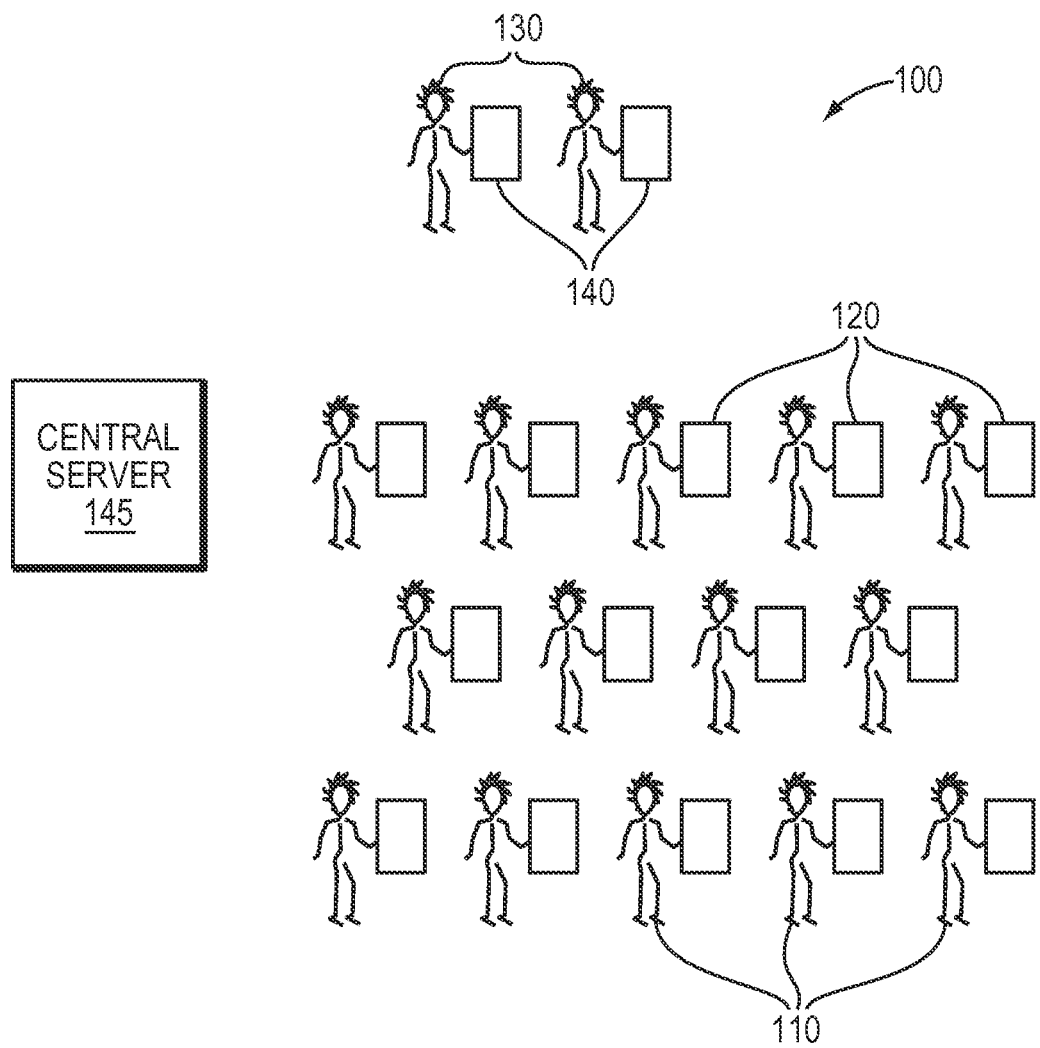
FIG. 1A schematically illustrates an activity having a gathering of participants and instructors.

FIG. 1A depicts an exemplary event or activity 100 where a gathering of participants 110, each having a handheld device 120, are led by one or more instructors or organizers 130, who may each have a handheld device 140. Again, the nature of the activity is not material to the invention, nor are the specific roles of instructor and participant; instructor(s) 130 may, for example, be chosen from the participants 110 or may be a different group of people. What is important is for the activity to involve the transmission of unfamiliar information whose assimilation and understanding is facilitated or enhanced by productive conversations.

The participants 110 and the instructor(s) 130 may directly communicate via the handheld devices 120, 140 or indirectly via a central server 145. The handheld devices 120, 140 may be, for example, computers, cell phones or other electronic devices that transmit participants' responses, attitudes, opinions, knowledge, characteristics, and/or understanding of relevant subject matter or items to one another, to the instructor(s) 130 and/or to the central server 145. The subject matter or an item may be a question or a discussion topic that the instructor(s) 130 pose(s) to participants 110 during the activity. In one embodiment, participants 110 are students, the activity 100 is a class and the instructor 130 is a professor or teacher who wishes to gauge student understanding of the content. The students may be co-located or geographically dispersed (e.g., distance learning classes). In another embodiment, the activity is a corporate training event attended by employees or a workshop attended by workshop participants where the session leader wishes to gauge the opinions of the participants. A person of ordinary skill in the art will appreciate that the invention described herein may be applicable to any group of participants pursuing pedagogical or intellectual endeavors.

Figure 1B:
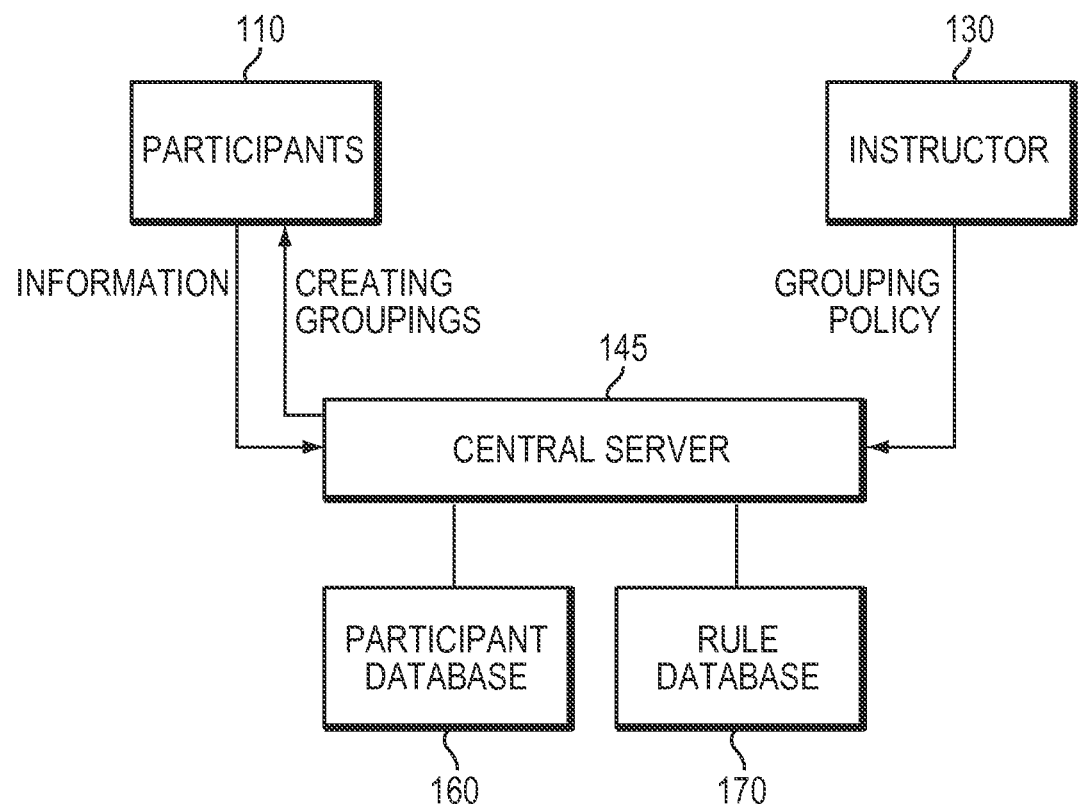
FIG. 1B depicts participants' information and a grouping policy set by instructors are transmitted to a central server and stored in a participant database and a rule database, respectively.

Referring to FIG. 1B, in the beginning of the activity, the participants 110 may wirelessly or otherwise (e.g., by a wired connection) transmit their identifiers, locations, characteristics (e.g., behavioral characteristics, performance characteristics, or demographic characteristics) and/or the handheld devices' identifiers to a central server 145; the central server 145 stores the received information in a participant database 160. The central server 145 may be implemented in the instructor's handheld device or in a separate, independent system in wireless (or wired) communication therewith. The instructor 130 sets up a grouping policy and transmits the policy to (or enters it into) the central server 145; the policy is stored in a rule database 170. The central server 145 creates groupings based on characteristics of the participants, the likelihood of having productive conversations in each group and/or the grouping policy-typically based on all three factors. Group assignments based on the generated groupings are automatically communicated to the participants 110 via the handheld devices to establish the groups.

The grouping policy may consider the relationships among participants with groups consisting of related participants -such as participants sitting near each other -being formed. In one embodiment, simple policies based on deterministic rules are utilized to establish groups. The deterministic rules define each group as having, for example, two or more different associated values for one or more participant characteristics (e.g., behavioral characteristics, performance characteristics, and/or demographic characteristics); these rules maximize participant diversity based on factors that may be different (or weighted differently) depending on the subject matter. For example, the deterministic rules may create (i) "groups of two where participants have different responses to a preliminary question"; (ii) "groups of three where there are 0, 1, 2, or 3. women"; (iii) "groups composed of members, each having different levels of knowledge of the discussion problem," or (iv) "groups of participants from different countries." Rules creating groups (ii) and (iv) utilize demographic data only, while rules creating groups (i) and (iii) focus on subject-matter knowledge. With the criteria upon which the rules themselves are based stored in the participant database 160, the rules themselves are straightforwardly implemented and combined according to pedagogical and group-dynamics criteria. For example, grouping rules (i) through (iv) may all be applied sequentially based on a desired order of priority, so that, for example, subject-matter knowledge may take primacy over demographics but the latter is not ignored altogether. In this way, all criteria deemed relevant are considered in formulating groups, and sparse participant data for a particular grouping rule or rule set is not fatal to operation.

In another embodiment, groups are adaptively created by more sophisticated policies that are based on statistical models-i.e., different groupings are selected based on statistical analysis of the characteristics of the participants being grouped. The statistical models predict the probability of having productive conversations in each potential group and then establish groups by maximizing the productive-conversation probabilities of all potential groups. Conversational productivity may be defined based on a desired pedagogical objective; for example, in teaching problem-based, difficult-to-grasp subject matter such as physics or engineering, a productive conversation may be one in which participants are likely to switch from a wrong answer to a correct answer to a problem posed by the instructor, to improve their understanding of the correct answer, and/or to understand why one of the wrong answers is in fact wrong.

Figure 2:
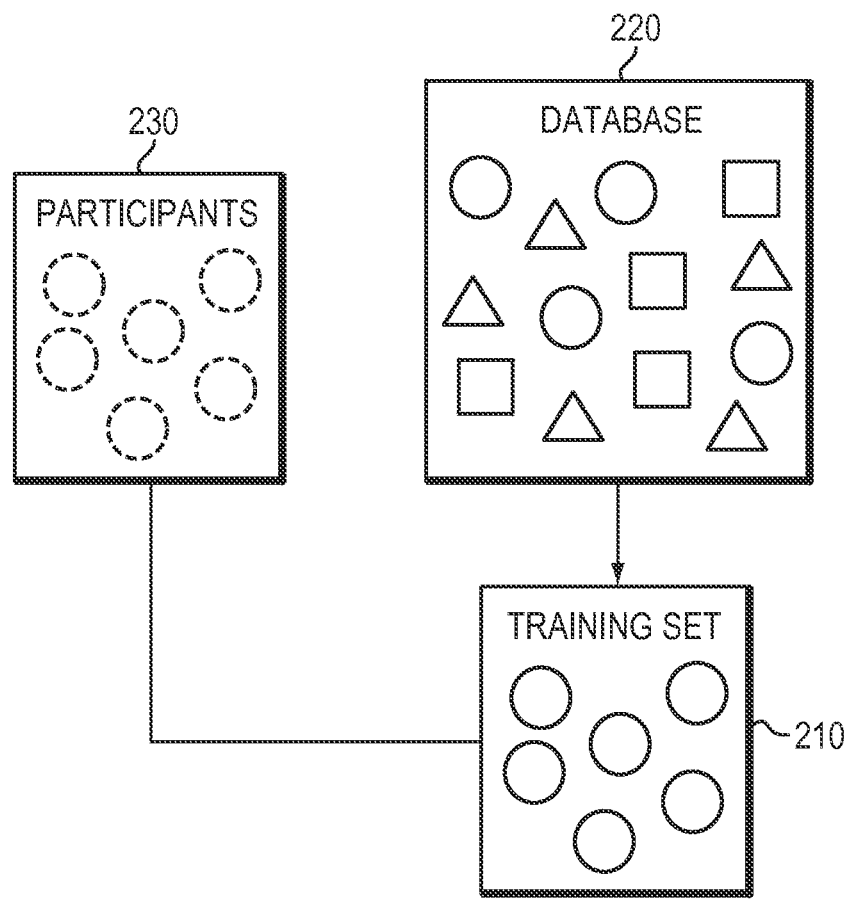
FIG. 2 depicts a selected training set of individuals who are related to the participants based on criteria relevant to the activity.

Referring to FIG. 2, in a second step of the embodiment under discussion, the sophisticated policies are implemented by selecting a raw training set 210 of individuals from a training database 220, which contains records specifying individuals at least some of whom are not participants in the current activity for which grouping is to take place. However, at least some proportion of individuals in the database 220 are related to the participants to be grouped 230 based on criteria relevant to the activity. For example, the individuals from the training database 220 who will form the training set are typically selected to maximize similarities of selected grouping "inputs" between individuals in the training set and the participants in the current activity. These "inputs" may include characteristics such as:

1.. Demographic characteristics of the participants and/or the instructor (e.g., age, sex, family income, educational background, origin, ethnicity, etc.). For a classroom-based current activity, the training database will have records specifying demographic characteristics of a class in which various of the listed individuals participated (e.g., class size, class composition based on the participants' demographic characteristics and/or experience, etc.), facilitating identification of training-set members who participated in a class demographically similar to the current class. For college-based activities, the training database will have records specifying demographic characteristics of the college (e.g., the ranking, specialties, catchment area for student population, etc.) attended by various of the listed individuals, and the geographic location of the college, facilitating identification of training-set members who attend a college demographically and/or geographically similar to the college where the current activity takes place.

2.. Behavioral characteristics of the participants (e.g., the reaction time to conceptual questions, the number of completed homework assignments, the percentage of positive feedback from other participants, etc.). The training database will have records specifying behavioral characteristics of at least some listed individuals, facilitating identification of training-set members who have behavioral characteristics similar to those of individuals participating in the current activity.

3.. Performance characteristics, including performance of the participants (e.g., scores on previous exams, correct answers to conceptual questions, completion of homework assignments, and positive peer instruction) and past performance on and contribution to in-class peer instruction or conversations (e.g., whether the participants have acquired new knowledge or improved their understanding from peer instruction, with which type of partners the participants have learned the most, etc.). The training database will have records specifying performance characteristics of at least some listed individuals, facilitating identification of training-set members who have performance characteristics similar to those of individuals participating in the current activity.

The training set may include the same participants who have attended the same activity (e.g., the same class from previous weeks) or a different activity (e.g., prerequisite classes) previously, or different participants who have attended the same or similar activities in the same or similar institutions. For example, the training set can be selected from the same class from an earlier semester in the same institution, the same or a similar class at another similar institution, or a similar class at the same institution. In one embodiment, the training set is selected from as many sources as are available and from which information may be obtained.

The number of individuals selected in the raw training set as described above may be larger than or equal to the number of participants in the current activity. In a third step of the embodiment under discussion, a nonparametric matching approach, for example, "Coarsened Exact Matching" (CEM) CEM (see, e.g., Iacus, King & Porro, "Causal Inference Without Balance Checking: Coarsened Exact Matching"; and Stefano, King & Porro, "Multivariate Matching Methods That are Monotonic Imbalance Bounding," the disclosures of which are hereby incorporated by reference) is used to remove from the raw training set individuals who are unlike any of the participants in the activity (i.e., whose inputs or characteristics are significantly different from the current participants). This step creates a composite training set composed of individuals who have maximally similar inputs or characteristics compared with the participants to be grouped in the present activity. Because a CEM approach requires no assumptions about generating the composite individuals, CEM advantageously reduces model dependence and statistical bias in the creation of the composite individuals and improves efficiency of the matching approach. Additionally, a CEM approach allows the determination of a threshold level of similarity and the importance of each input variable ex ante. Other matching approaches utilized in causal inference may be suitable for creating composite individuals and are thus within the scope of the current invention; many of these are detailed in Ho, Imai, King, & Stuart, "Matching as Nonparametric Preprocessing for Reducing Model Dependence in Parametric Causal Inference," *Political Analysis* 15. (2007): 199-236. (the entire disclosure of which is hereby incorporated by reference). The selected matching approaches may be related or unrelated to the current tasks (i.e., grouping); if an unrelated matching approach (e.g., estimating causal inferences, record linkage in unconnected databases, and/or missing data imputation) is chosen, modifications of the selected approach for use herein may be necessary.

In a fourth step of the embodiment under discussion, an ensemble classifier based on statistical models and/or machine learning approaches is used to compute a functional relationship between the inputs or characteristics of the composite individuals and the likelihood of having a productive conversation in the groups of the composite training set. Based on the computed functional relationship and the inputs of the current participants to be grouped, a likelihood of having productive conversations for each potential group of the participants (i.e., grouping success likelihood) is predicted.

A standard stability (assured by how the composite training set is selected and matched) is assumed in the prediction of the occurrence of a productive conversation in a dyad, triad, or other-sized groupings. Optimized groupings are then selected based on maximizing the likelihood of having productive conversations in all potential groups. This grouping information is automatically transmitted to the participants wirelessly or otherwise (e.g. a wired connection) via the handheld devices. The ensemble classifier may be defined and used straightfowardly; much literature exists in statistics, machine learning, and applied statistics relating to improving classifiers and applying them to different areas. See, e.g., Hastie, Trevor; Jerome Friedman; and Robert Tibshirani, *Elements of Statistical Learning: Data Mining, Inference, and Prediction* (2009), which is incorporated herein by reference.

The results from the groupings (i.e., whether each group produces productive conversations) are analyzed after the activity and stored in the training database 220. In a subsequent activity, the functional relationship between the inputs and the grouping success likelihood (based on success actually achieved in the groups utilized) may be newly computed or updated partially based on the newly stored results. Because the ensemble classifier is based upon statistical models and/or machine learning approaches, the functional relationship becomes more accurate as more individuals' information is stored in the training database 220; this is due to an increasing likelihood of selecting a good match set of composite individuals for the training set. As a result, the accuracy of the success-likelihood prediction in each potential group increases over time. The grouping approach in the current invention thereby improves over time as the database grows while maintaining the underlying structure.

In some embodiments, the groupings are formed at least partially based on a constrained grouping policy. For example, suppose the grouping policy involves the geographical locations of the participants where group members must be seated in proximity to one another. The participants' locations are first identified by, for example, a global positioning system, seat numbers assigned by the instructor, or an identified location of one or more other participants. The location information is then transmitted to the central server 145 via the participants' handheld devices and stored in a database. Groupings of the participants are then selected based on maximizing the likelihood of having productive conversations in potential groups (i.e., grouping success likelihood) while also satisfying the physical constraints on the participants' geographical locations.

Figure 3:
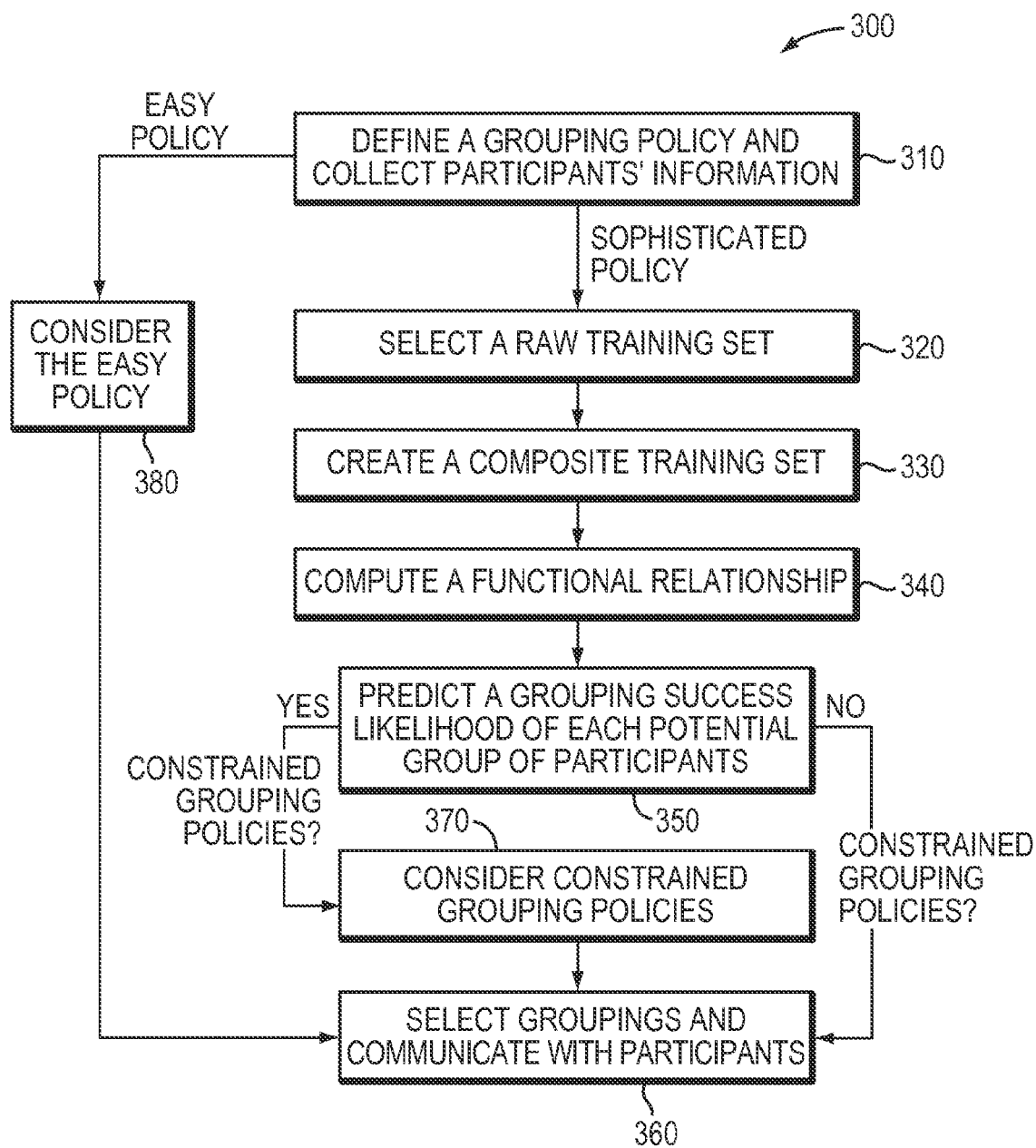
FIG. 3 depicts a method for grouping participants in an activity in accordance with embodiments of the current invention.

A representative method 300 for grouping participants in an activity in accordance with embodiments of the current invention is shown in FIG. 3. In a first step 310, a grouping policy is defined by the instructor(s) and the participants' identifiers (and/or the identifiers of the participants' handheld devices), along with characteristics of the participants relevant to grouping for the current activity, are transmitted to a central server and stored in a rule database and a participant database, respectively. If the grouping policy is a sophisticated policy, in a second step 320, a raw training set containing individuals is chosen; the individuals relate to the participants based on criteria relevant to the activity. In a third step 330, a nonparametric matching approach is utilized to create a composite training set where the similarities of the composite individuals' inputs and the participants' inputs are maximized. In a fourth step 340, a functional relationship between the composite individuals' inputs and a grouping success likelihood in the composite training set is computed. In a fifth step 350, a grouping success likelihood of each potential group of participants is predicted based on the computed functional relationship and the inputs of the participants. In a sixth step 360, optimal groupings are selected and the grouping information is communicated to the participants via their handheld devices. If a constrained grouping policy is set by the instructor, the optimal groupings may include this constraint (step 370). Alternatively, if the grouping policy is a simple policy having deterministic rules, the groupings can be easily established based thereupon. Again, this grouping information is then transmitted to the participants via the handheld devices (step 380).

Figure 4:
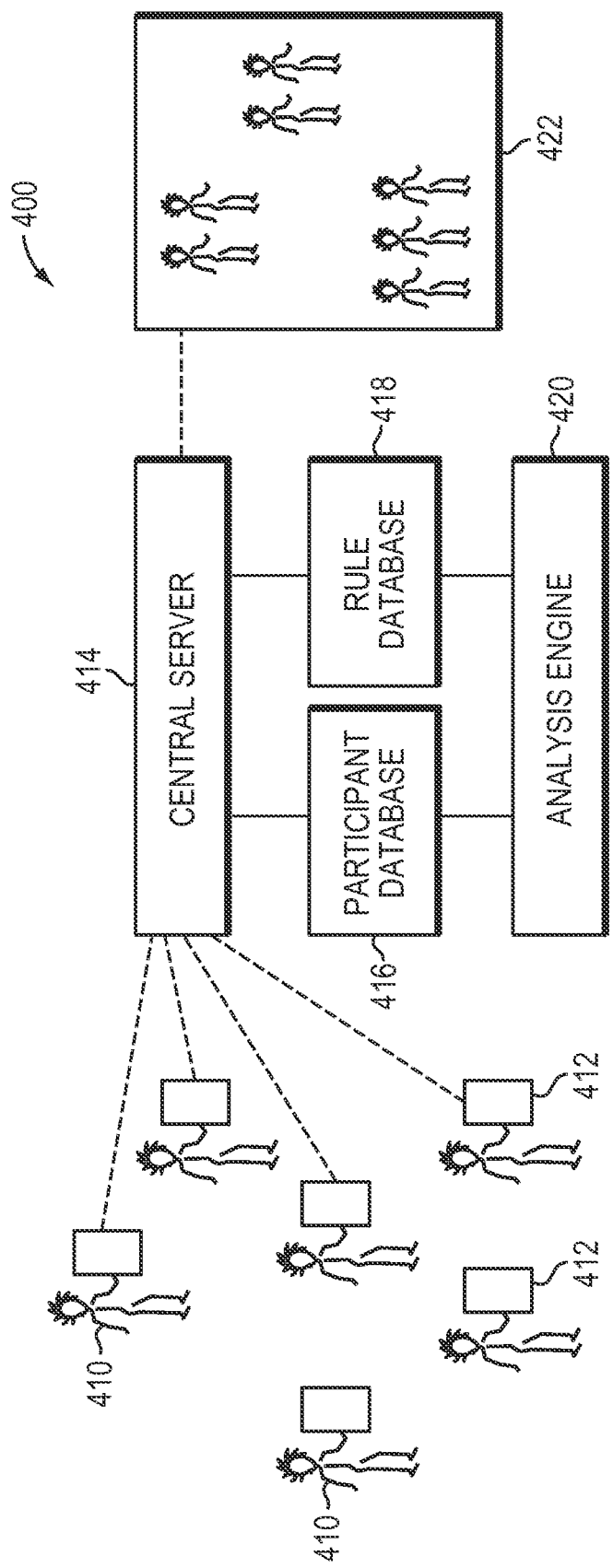
FIG. 4 illustrates a system for grouping participants in an activity in accordance with embodiments of the current invention.

A system 400 for grouping participants in an activity in accordance with embodiments of the current invention is shown in FIG. 4. An ungrouped set of participants 410 each has a handheld device 412; as noted above, the participants may be co-located or may be geographically dispersed. A central server 414 includes (or is in communication with) a participant database 416, which contains records for the participants 410 as well as for other individuals who may be used in a training set. Each record identifies the participant 410, his or her handheld device 412, and participant-specific values for characteristics relevant to the activity (and, therefore, to optimal groupings). A rules database 418 contains rules associated with the grouping policy. An analysis engine 420 accesses databases 416, 418 and defines groupings based on the grouping policy and characteristics of the participants as described above. If necessary, the central server 414 communicates with participants 410 to obtain data necessary to the analysis. Based on the analysis, the participants are grouped as described above, and the central server 414 communicates the groupings to the handheld devices 412 of the participants 410 to establish the groups, as indicated at 422. Typically, communication with the handheld devices 412 occurs wirelessly, e.g., by SMS, an automated telephone call, e-mail or other suitable form of communication.

Analysis engine 420 may be implemented by computer-executable instructions, such as program modules, that are executed by a conventional computer. Generally, program modules include routines, programs, objects, components, data structures, etc. that performs particular tasks or implement particular abstract data types. Those skilled in the art will appreciate that the invention may be practiced with various computer system configurations, including multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

Any suitable programming language may be used to implement without undue experimentation the analytical functions described above. Illustratively, the programming language used may include assembly language, Ada, APL, Basic, C, C++, C*, COBOL, dBase, Forth, FORTRAN, Java, Modula-2, Pascal, Prolog, Python, RUM and/or JavaScript for example. Further, it is not necessary that a single type of instruction or programming language be utilized in conjunction with the operation of the system and method of the invention. Rather, any number of different programming languages may be utilized as is necessary or desirable.

The servers described herein may each be one or more server-class computers, such as a PC having a CPU board containing one or more processors such as the Pentium or Celeron family of processors manufactured by Intel Corporation of Santa Clara, Calif., the 680×0. and POWER PC family of processors manufactured by Motorola Corporation of Schaumburg, Ill., and/or the ATHLON line of processors manufactured by Advanced Micro Devices, Inc., of Sunnyvale, Calif. The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media.

The processor that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

As noted, the handheld devices 412 typically communicate with the central server 404 via a wireless link, but communication may take place in any convenient manner, e.g., via a wired or wireless local area network (LAN) and a wide area network (WAN), wireless personal area network (PAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system for grouping participants in an activity, the participants each having a handheld device, the system comprising:
    a memory, the memory for storing participant records for one or more of the participants; and
    a processor in operative communication with the memory, the processor being configured to:
        determine one or more deterministic rules associated with one or more participant characteristics;
        determine the one or more participant characteristics associated with the participants, the one or more participant characteristics comprising:
            at least one characteristic associated with one or more of the participants, and
            an associated value of the at least one characteristic, wherein the associated value is identified from past performance between the participants and one or more questions to identify the participants' knowledge of relevant subject matter;
        determine a first group of participants associated with a first set of participant characteristics and associated values, the first group including at least a first participant;
        determine a second group of participants associated with a second set of participant characteristics and associated values, the second group including at least the first participant;
        computationally estimate a functional relationship of the first group of participants and the second group of participants by comparing the first set of participant characteristics and associated values with the second set of participant characteristics and associated values;
        determine that the associated values for the first group of participants is greater than the associated values for the second group of participants, wherein determining whether the associated values for the first group of participants is greater than the associated values for the second group of participants is based in part on the one or more deterministic rules; and
        communicate with the first group of participants in a communication through the participants' handheld devices, wherein:
            the communication identifies at least the first participant to a recipient of the communication, and
            the recipient of the communication is a second participant of the first group.

2. The system of claim 1, wherein the one or more deterministic rules is based at least in part on a statistical model.

3. The system of claim 2, wherein the statistical model is a coarsened exact matching model.

4. The system of claim 1, wherein the one or more participant characteristics include a likelihood to increase conversational productivity, wherein the conversational productivity comprises at least one of:
    (i) switching from a wrong answer to a correct answer,
    (ii) improving the participants' understanding of the correct answer, or
    (iii) improved understanding of why a wrong answer is wrong.

5. The system of claim 1, wherein the participants are co-located within a single defined space, the one or more deterministic rules requiring a defined proximity between members of a group based on geographic locations of the handheld devices.

6. The system of claim 1, the processor being further configured to:
    store, in the memory associated with the system, the participant records associated with each of the participants comprising a participant identifier, an identifier for the one or more of the participants' handheld devices, and the at least one characteristic associated with the participants.

7. The system of claim 1, wherein the deterministic rules comprise requiring at least two different associated values for at least one participant characteristic in each group.

8. The system of claim 7, wherein the at least one participant characteristic comprises at least one of a behavioral characteristic, a performance characteristic, or a demographic characteristic.

9. The system of claim 1, wherein determining the first group of participants and determining the second group of participants are determined by:
    defining a set of candidate participant groupings consistent with the one or more deterministic rules and, for each candidate grouping, estimating a grouping success likelihood based on the functional relationship; and
    selecting optimized groupings based on the estimated grouping success likelihoods.

10. The system of claim 9, wherein determining the first group of participants and determining the second group of participants further comprises:
    analyzing grouping success of the first group of participants and determining the second group of participants and updating the functional relationship based thereon.

11. The system of claim 1, wherein a training set is established based on nonparametric matching of candidate individuals to the participants using inputs that are specific to each individual.

12. The system of claim 11, wherein the inputs include at least one of (i) demographic characteristics, (ii) behavioral characteristics, or (iii) performance characteristics.

13. The system of claim 12, wherein the demographic characteristics comprise at least one of participants' backgrounds, an organizer's background, or a geographic location of the activity.

14. The system of claim 13, wherein the performance characteristics comprise at least one of participants' performances in the activity or other activities previously.

15. The system of claim 1, wherein the one or more deterministic rules is based at least in part on geographic proximities among potential group members.

16. A method for grouping participants in an activity, the participants each having a handheld device, the method comprising:
    determining one or more deterministic rules associated with one or more participant characteristics;
    determining the one or more participant characteristics associated with the participants, the one or more participant characteristics comprising:
        at least one characteristic associated with one or more of the participants, and
        an associated value of the at least one characteristic, wherein the associated value is identified from past performance between the participants and one or more questions to identify the participants' knowledge of relevant subject matter;

determining a first group of participants associated with a first set of participant characteristics and associated values, the first group including at least a first participant;

determining a second group of participants associated with a second set of participant characteristics and associated values, the second group including at least the first participant;

computationally estimating a functional relationship of the first group of participants and the second group of participants by comparing the first set of participant characteristics and associated values with the second set of participant characteristics and associated values;

determining that the associated values for the first group of participants is greater than the associated values for the second group of participants, wherein determining whether the associated values for the first group of participants is greater than the associated values for the second group of participants is based in part on the one or more deterministic rules; and communicating with the first group of participants in a communication through the participants' handheld devices, wherein:

the communication identifies at least the first participant to a recipient of the communication, and the recipient of the communication is a second participant of the first group.

17. The method of claim 16, wherein the one or more deterministic rules is based at least in part on a statistical model.

18. The method of claim 17, wherein the statistical model is a coarsened exact matching model.

19. The method of claim 16, wherein the one or more participant characteristics include a likelihood to increase conversational productivity, wherein the conversational productivity comprises at least one of:

(i) switching from a wrong answer to a correct answer, (ii) improving the participants' understanding of the correct answer, or (iii) improved understanding of why a wrong answer is wrong.

20. The method of claim 16, wherein the participants are co-located within a single defined space, the one or more deterministic rules requiring a defined proximity between members of a group based on geographic locations of the handheld devices.

* * * * *